United States Patent
Marupaduga et al.

(10) Patent No.: US 10,958,317 B1
(45) Date of Patent: Mar. 23, 2021

(54) CONTROLLING MAXIMUM MU-MIMO GROUP SIZE BASED ON CELL DIMENSION

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 106 days.

(21) Appl. No.: 16/257,104

(22) Filed: Jan. 25, 2019

(51) Int. Cl.
*H04B 7/0452* (2017.01)
*H04B 7/06* (2006.01)
*H04W 72/04* (2009.01)
*H04L 5/00* (2006.01)
*H04W 72/12* (2009.01)

(52) U.S. Cl.
CPC ......... *H04B 7/0452* (2013.01); *H04B 7/0617* (2013.01); *H04L 5/0048* (2013.01); *H04L 5/0053* (2013.01); *H04W 72/0453* (2013.01); *H04W 72/121* (2013.01)

(58) Field of Classification Search
None
See application file for complete search history.

(56) References Cited

U.S. PATENT DOCUMENTS

| | | | |
|---|---|---|---|
| 9,743,258 B1 | 8/2017 | Elsherif et al. | |
| 2015/0230263 A1* | 8/2015 | Roy | H04B 7/088 455/452.2 |
| 2015/0271814 A1* | 9/2015 | Park | H04L 5/0082 370/329 |
| 2015/0381396 A1* | 12/2015 | Chen | H04J 13/16 370/254 |
| 2017/0099092 A1* | 4/2017 | Kakishima | H04L 1/00 |
| 2018/0310283 A1* | 10/2018 | Deenoo | H04W 72/046 |
| 2018/0337709 A1* | 11/2018 | Zou | H04L 1/203 |

* cited by examiner

*Primary Examiner* — Mohammad S Adhami

(57) ABSTRACT

A method for configuring a base station to group UEs for MU-MIMO service, where the base station provides wireless communication service in a cell having a geometric size. In an example implementation, the method includes determining, based on the geometric size of the cell, a maximum quantity of UEs that the base station should allow per MU-MIMO group, and configuring the base station to apply the determined maximum quantity when grouping UEs for MU-MIMO service. For instance, the maximum quantity of UEs per MU-MIMO group could be set based on the radius of the cell.

18 Claims, 5 Drawing Sheets

```
┌─────────────────────────────────────┐
│  DETERMINE, BASED ON THE            │
│  GEOMETRIC SIZE OF A BASE           │
│  STATION'S CELL, A MAXIMUM          │
│  QUANTITY OF UEs THAT THE BASE      │──40
│  STATION SHOULD ALLOW PER           │
│  MU-MIMO GROUP IN THE CELL          │
└─────────────────────────────────────┘
                 │
                 ▼
┌─────────────────────────────────────┐
│  CONFIGURE THE BASE STATION TO      │
│  APPLY THE DETERMINED MAXIMUM       │──42
│  QUANTITY WHEN GROUPING UEs         │
│  FOR MU-MIMO SERVICE                │
└─────────────────────────────────────┘
```

CONTROLLING MAXIMUM MU-MIMO GROUP SIZE BASED ON CELL DIMENSION

BACKGROUND

A wireless communication system typically includes a number of base stations that are each configured to provide service in one or more cells where user equipment devices (UEs) such as cell phones, tablet computers, tracking devices, embedded wireless modules, and other wirelessly equipped communication devices (whether or not user controlled), can operate. In turn, each base station could be coupled with network infrastructure that provides connectivity with one or more transport networks, such as the public switched telephone network (PSTN) and/or the Internet for instance. With this arrangement, a UE within coverage of the system could engage in air interface communication with a base station and could thereby communicate via the base station with various remote network entities or with other UEs served by the base station.

Each cell of such a system could operate in accordance with a particular radio access technology, with air-interface communications from the base stations to UEs defining a downlink or forward link and air-interface communications from the UEs to the base stations defining an uplink or reverse link.

Over the years, the industry has embraced various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with the radio access technology, each coverage area could operate on a carrier, which could be frequency division duplex (FDD), defining separate frequency channels for downlink and uplink communication, or time division duplex (TDD), with a single frequency channel multiplexed over time between downlink and uplink use. Further, on the downlink and uplink, the carrier could be structured to define various physical channels including time-frequency resources for carrying information between the base stations and UEs. For example, the air interface could be divided over time into frames, each divided in turn into subframes and timeslots, and the carrier bandwidth could be divided over frequency into subcarriers, which could be grouped within each timeslot to define physical resource blocks (PRBs) in which the subcarriers can be modulated to carry data.

The base station could then be configured to coordinate use of these air-interface resources on an as-needed basis. For example, when the base station has data to transmit to a UE, the base station could allocate particular downlink air-interface resources to carry that data and could accordingly transmit the data to the UE on the allocated downlink resources. And when a UE has data to transmit to the base station, the UE could transmit to the base station an uplink resource request, the base station could responsively allocate particular uplink air-interface resources to carry the data, and the UE could then transmit the data to the base station on the allocated uplink resources.

Overview

One of the key performance metrics of a wireless communication system is its spectral efficiency, namely, the extent of data that the system can carry per unit of frequency spectrum. The spectral efficiency of a wireless communication system or its base stations could be measured as a quantity of bits per Hertz.

If a wireless communication system has low spectral efficiency, a provider of the system may need to configure the system with additional licensed spectrum, such as wider carriers and/or more carriers, in order to accommodate subscriber communication needs. However, adding licensed spectrum could be costly and therefore undesirable.

One way to help improve spectral efficiency is to make use of MIMO technology.

With MIMO, a base station can engage in air interface communication concurrently on multiple different radio-frequency (RF) propagation paths, or MIMO "layers," with multiple layers occupying the same frequency resources (e.g., subcarriers and PRBs) as each other. To facilitate this, the base station could be equipped with a MIMO antenna array, comprising multiple transmit antennas and multiple receive antennas. By suitably weighting and precoding transmissions by particular antennas in the array, and through use of beamforming, the base station can then output spatially separate but concurrent transmissions for receipt by its served UEs. Because these concurrent transmissions occupy the same frequency resources (e.g., subcarriers) as each other, MIMO can thereby support a greater extent of data communication per unit frequency, thereby increasing the base stations' spectral efficiency and possibly avoiding or deferring the need to add more spectrum.

To provide many such layers, the base station could be equipped with a massive-MIMO antenna array. While a traditional MIMO antenna array may include on the order of 2 to 8-4 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, if 4 transmit antennas are used per layer (e.g., to facilitate beamforming), the massive-MIMO antenna array might support on the order of 16 layers, which may facilitate concurrent service of 8 UEs with 2 layers apiece or 16 UEs with 1 layer apiece, among other possibilities.

MIMO service can be used in a "multi-user MIMO" (MU-MIMO) configuration to increase the data capacity of the air interface by allowing communications to a group of UEs to use the same air-interface resources as each other. For instance, a base station can modulate data streams destined to each of the UEs on the same PRBs as each other, and the base station could pre-code the transmissions on each path using weighted coefficients based on channel estimates from the UEs in a manner that enables each UE to remove cross-talk and receive its intended data. Further, the base station could beamform the transmissions respectively to each UE to help physically distinguish the transmissions from each other.

When a base station serves many UEs at once, the base station could beneficially apply MU-MIMO in order to provide concurrent high-throughput transmissions to the UEs. For example, if the base station's air interface has 100 PRBs per timeslot and the base station has a massive-MIMO array as discussed above, then, with MU-MIMO, the base station could theoretically transmit concurrently to 8 UEs (with 2 layers apiece) on all 100 of those PRBs, so that all of the UEs could receive data within that many PRBs at once.

To facilitate MU-MIMO service, the UEs that will share air-interface resources (e.g., PRBs) should be "orthogonal" to each other, meaning that each UE could receive spatially separate transmissions from the base station without undue interference from the base station's transmissions to each other UE. Thus, when a base station is going to apply MU-MIMO (perhaps in response to the base station being heavily loaded with connected UEs having high throughput requirements), the base station could select a group of UEs to be a MU-MIMO group based on the UEs being orthogonal to each other. And the base station could then configure transmissions to the UEs of the MU-MIMO group to occur on the same PRBs as each other.

The base station could deem the UEs of a group to be orthogonal to each other if the UEs have sufficient angular separation from each other, such that the base station's beamformed transmission to one UE of the group would not unduly interfere with the base station's beamformed transmission to any other UE of the group. To make this determination, the base station could conduct an analysis for each of various UEs to determine an angle of arrival at which the base station receives transmissions from the UE, and the base station could compare angles of arrival of various UEs in an effort to identify a group of UEs in which each UE's angle of arrival is threshold different than each other UE's angle of arrival.

When a base station is serving many UEs and seeks to apply MU-MIMO service, at issue may be how many UEs the base station should include in each MU-MIMO group, i.e., to be served on the same PRBs as each other. In particular, at issue may be what is the maximum number of UEs that the base station will include in any given MU-MIMO group.

The resolution of this issue could relate to the extent of processing that would likely be required by the base station to determine orthogonality. If a base station is going to include just two UEs in a MU-MIMO group, then the base station may need to determine that the two UEs are orthogonal to each other. But for each additional UE that the base station might then include in the MU-MIMO group, the base station may need to determine that the additional UE is orthogonal to each of the other UEs in the MU-MIMO group. Consequently, the larger the MU-MIMO group will be, the more processing may be required by the base station to evaluate and determine orthogonality sufficient to support serving the group of UEs on the same PRBs as each other.

The present disclosure provides a mechanism to help establish what the maximum quantity of UEs should be for MU-MIMO grouping by a base station. The disclosure stems from a realization that the larger a base station's cell, the more widely distributed UEs in the cell may be, and the more likely it may be that UEs in the cell are orthogonal to each other; whereas the smaller a base station's cell, the less widely distributed UEs in the cell may be, and the less likely it may be that UEs in the cell are orthogonal to each other. Given this, if a cell is particularly small, then it may be efficient for the base station to limit the quantity of UEs per MU-MIMO group to a relatively small number, as the likelihood of finding additional orthogonal UEs beyond that number may be relatively low. Whereas, if a cell is particularly large, then it may be more worthwhile having the base station go through the additional processing associated with finding a greater quantity of UEs to group together for MU-MIMO service, to help further increase spectral efficiency.

Accordingly, disclosed herein is a method for configuring a base station to group UEs for MU-MIMO service, where the base station provides wireless communication service in a cell having a geometric size. Per the disclosure, the method includes determining, based on the geometric size of the cell, a maximum quantity of UEs that the base station should allow per MU-MIMO group, and configuring the base station to apply the determined maximum quantity when grouping UEs for MU-MIMO service.

Further, disclosed is a base station operable to control grouping of UEs for MU-MIMO service, where the base station provides wireless communication service in a cell having a geometric size. The base station includes an antenna array comprising a plurality of antennas for communicating over an air interface of the cell, the air interface defining time-frequency resources for carrying data wirelessly between the base station and UEs served by the base station. And the base station further includes a controller having a processing unit and non-transitory data storage holding program instructions executable by the processing unit to cause the base station to carry out operations including (i) determining, based on the geometric size of the cell, a maximum quantity of UEs that the base station should allow per MU-MIMO group and (ii) applying the determined maximum quantity when grouping UEs for MU-MIMO service.

In an example implementation, for instance, the controller could be configured to schedule use of the time-frequency resources to carry the data wirelessly between the base station and the UEs, and the controller could be configured to select a group of the UEs to be a MU-MIMO group that the controller will schedule to communicate with the base station on the same time-frequency resources as each other. The controller could then be configured to limit a size of the MU-MIMO group to a maximum quantity of UEs, with the maximum quantity being based at least on the geometric size of the cell.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate aspects by way of example only and not by way of limitation.

DETAILED DESCRIPTION

Figure 1:
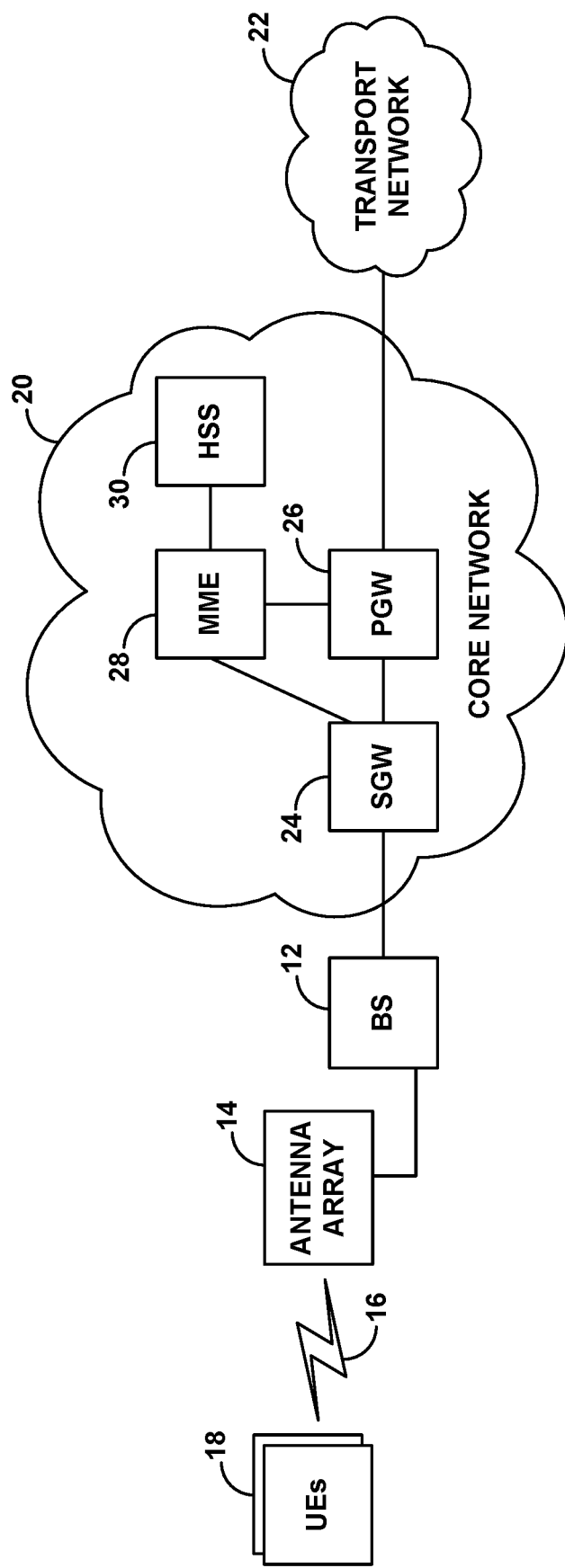
FIG. 1 is a simplified block diagram of an example wireless communication system in which various disclosed features can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes a representative base station 12 having an antenna array 14 through which the base station is configured to provide service in a cell 16. Shown operating within the cell are then a plurality of UEs 18, which could be devices of the type discussed above, among other possibilities.

The base station could be a macro base station of the type configured to provide a wide range of coverage, and the antenna array could be mounted on a tower or other tall structure. Alternatively, the base station could take other forms, such as a small cell base station, a repeater, a femtocell base station, or the like, which might be configured to provide a smaller range of coverage. The base station could be configured to operate according to a 4G, 5G, or other radio access technology. For instance, the base station could be an LTE evolved Node-B (eNB) or a 5G NR gigabit Node-B (gNB), among other possibilities.

The base station is shown coupled with a core network 20, which could be an enhanced packet core (EPC) network, next generation core (NGC) network, or another network including components supporting an applicable radio access technology and providing connectivity with at least one transport network 22, such as the Internet.

In an example implementation as shown, the core network 20 includes a serving gateway (SGW) 24, a packet data network gateway (PGW) 26, a mobility management entity (MME) 28, and a home subscriber server (HSS) 30. In particular, the base station has an interface with the SGW, the SGW has an interface with the PGW, and the PGW provides connectivity with the transport network. Further, the base station has an interface with the MME, and the MME has an interface with the SGW and the HSS.

With this arrangement, the SGW and PGW cooperatively provide user-plane connectivity between the base station and the transport network, to enable a UE served by the base station to engage in communication on the transport network. And the MME operates as a controller to carry out operations such as coordinating UE attachment and setup of user-plane bearers. Further, the HSS includes or has access to a data store containing UE capabilities and service profile data and can work with the MME to facilitate UE authentication.

As discussed above, the air interface between the base station and UEs within its coverage could be structured to define various air interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements. Variations of this arrangement are possible as well.

Further, particular groupings of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well. For instance, certain resource elements on the uplink could be assigned on a per-UE basis to carry SRS transmission from the UE to the base station, which the base station could use as a basis to determine angle of arrival and for other purposes.

In operation, when a UE enters into coverage of the base station on a carrier, the UE could detect the base station's synchronization signal and could then read the base station's MIB or the like to determine the carrier's bandwidth. The UE could then engage in random access signaling and Radio Resource Control (RRC) configuration signaling with the base station to connect with the base station on the carrier, thus putting the UE in an RRC-connected mode.

Once the UE is connected with the base station, the UE could then transmit to the base station an attach request, which the base station could forward to the MME for processing. And after working with the HSS to authenticate the UE, the MME could coordinate setup for the UE of one or more user-plane bearers between the base station and the PGW, to enable the UE to engage in communication on the transport network. Further, the base station could establish for the UE a context record indicating operational state of the UE, and the base station could receive from the UE and/or the HSS (via the MME) a set of capabilities and profile data for the UE and could store that data in the context record for reference while serving the UE.

The base station could then serve the UE with data communications.

For instance, when data arrives at the base station for transmission to the UE, the base station could allocate one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs.

And when the UE has data to transmit to the base station (e.g., for transmission on the transport network), the UE could transmit to the base station a scheduling request that carries with it a buffer status report (BSR) indicating how much data the UE has buffered for transmission. And in response the base station, could allocate one or more uplink PRBs in an upcoming subframe for carrying a transport block of that data from the UE and could transmit to the UE a DCI message that designates those upcoming PRBs. The UE could then accordingly transmit the transport block to the base station in the designated PRBs.

While the base station is so serving a connected UE, the UE could also transmit various operational information to the base station to assist with the base station's allocation of PRBs and other service of the UE.

For example, the UE could regularly evaluate the quality of its air interface connection with the base station, such as based on reference-signal receive strength and/or quality (e.g., SINR) and could periodically transmit to the base station a channel-quality-indicator (CQI) value that represents the UE's determined level of channel quality. When the base station is going to allocate PRBs to carry data to or from the UE, the base station could then map the UE's most recent reported CQI to an applicable modulation and coding scheme (MCS) that defines how much error-correction-coding to include with the transmission and what modulation scheme to use for modulating the data onto resource elements. Based on this analysis and on the quantity of PRBs to be allocated, the base station could thus determine what size transport block of data could be carried, and the base station could allocate those PRBs for carrying that transport block.

In practice, the base station may serve multiple connected UEs at a time, and the base station may face a need to schedule data transmissions concurrently to multiple such UEs and/or from multiple such UEs. Because the base station's air interface has just a finite, limited number of PRBs per unit time (e.g., per subframe), the base station could implement a scheduling algorithm in an effort to fairly and appropriately allocate the PRBs among the base station's served UEs.

Yet as noted above, the base station may still face load issues. For instance, there could be times when the base station is serving many connected UEs at once and faces a need to schedule data transmissions to many such UEs at once, but the base station does not have sufficient PRBs per unit time to adequately meet the throughput needs of the UEs.

As noted above, the base station could use MIMO to help overcome this problem. In particular, the base station could apply MU-MIMO to facilitate serving multiple UEs at once on the same PRBs as each other and may thereby be able to provide the multiple UEs with a desired level of throughput while also achieving improved spectral efficiency. As further noted above, one way to provide such MIMO service is with use of a massive-MIMO antenna array. Thus, in an example implementation, the base station's antenna array 14 could be a massive-MIMO array.

Figure 2:
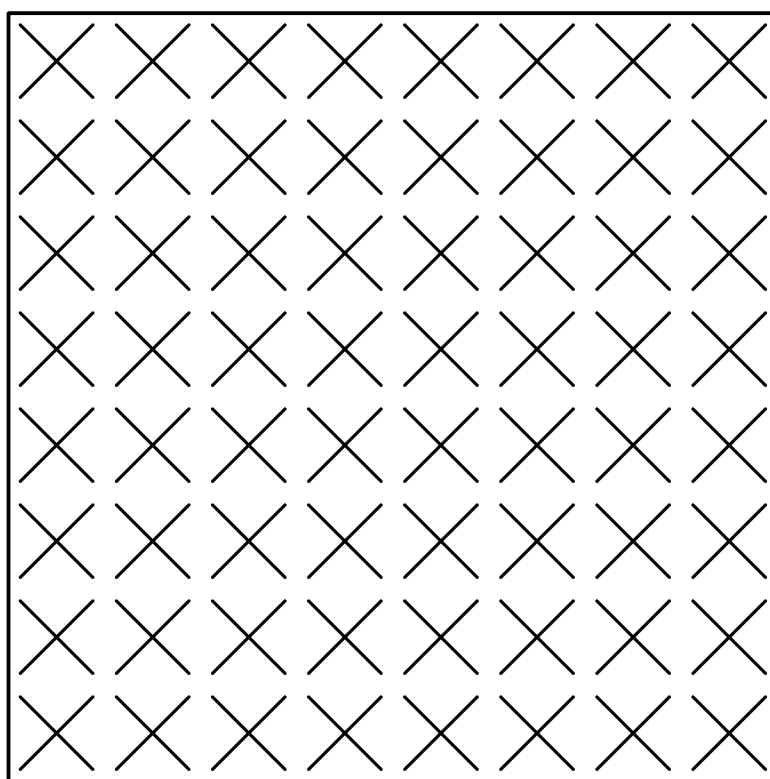
FIG. 2 is a simplified diagram of an example massive-MIMO antenna array that could be implemented according to the disclosure.

FIG. 2 is a simplified diagram of an example massive-MIMO array that could be implemented at base station 12. In this illustration, each X represents two antennas (or antenna elements), one with positive polarization and one with negative polarization. As a result, each column in the example array includes eight antennas with positive polarization and eight antennas with negative polarization. As there are eight columns of antennas, the massive-MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

As discussed above, with this example massive-MIMO antenna array, the base station may be able to provide 16 layers of MIMO transmission. For instance, for each layer, the base station could use 4 of its transmit antennas to provide beamformed transmission defining a respective MIMO layer. Thus, the base station could in theory transmit with up to 16 layers on a common set of air interface resources (e.g., PRBs). Other MIMO arrangements are possible as well. Further, the base station could provide MIMO service with another sized antenna array or with other types of antenna structures.

As noted, the base station could transmit individual MIMO layers to UEs, by beamforming and/or pre-coding the transmissions. For example, the base station could beamform transmissions to an individual UE by evaluating angle of arrival of uplink signals (e.g., an uplink sounding reference signal (SRS)) from the UE and setting phase and amplitude of downlink transmission from various antenna elements so as to direct the transmission toward the UE. Further, the base station could pre-code individual transmissions to a UE to help the UE distinguish those transmissions from others and extract the transmissions from a combination of received downlink signals. For instance, the base station could transmit one or more downlink modulation reference signals (DMRSs) that the UE can receive and evaluate in order to establish and report channel estimates, and the base station could use those channel estimates as a basis to pre-code transmissions with weighted coefficients that enable the UE to receive and uncover the transmissions.

Assuming sufficient orthogonality between UEs of a group, the base station could thus transmit to the UEs of the group on the same PRBs as each other, i.e., at the same time and on the same subcarriers as each other. The transmissions to the UEs would occupy the same PRBs as each other, but would be distinguished from each other through beamforming, pre-coding, and/or one or more other mechanisms.

Thus, in each downlink subframe, the base station could allocate a given set of PRBs to each of multiple UEs of a MU-MIMO group and could provide downlink transmission on the allocated PRB(s) respectively to each UE of the MU-MIMO group, using one or more MIMO layers respectively for each UE.

The base station could thus theoretically allocate all of the PRBs of a subframe to the MU-MIMO group, so that each UE of the MU-MIMO group can receive data transmissions on one or more MIMO layers within all of those PRBs. Alternatively, the base station might allocate some of the PRBs of the subframe to a first MU-MIMO group of UEs and transmit to those UEs with MIMO layers on those PRBs, and the base station might allocate other PRBs of the subframe to a second MU-MIMO group of UEs and transmit to those UEs with MIMO layers on those PRBs. Further, the base station might allocate some PRBs of the subframe for use without MIMO or in other ways. And still further, note that MU-MIMO could likewise be applied on the uplink.

To configure MU-MIMO service for a UE, the base station may engage in signaling with the UE to obtain channel estimates and precoding information, and the base station may work with the UE through DCI signaling to prepare the UE for receipt of beamformed and pre-coded transmissions or the like.

As discussed above, at issue in this process could be how many UEs the base station should include in any given MU-MIMO group that the base station will establish, and particularly what the maximum number of UEs is that the base station should include in any such MU-MIMO group. As explained above, the present disclosure provides for setting the maximum quantities based on a geometric size of the base station's cell. If the geometric size is relatively small, then the maximum number of UEs per MU-MIMO group could be set to a relatively low number. Whereas, if the geometric size is relatively large, then the maximum number of UEs per MU-MIMO group could be set to a relatively large number (of course limited further by the number of distinct MIMO layers that the base station's antenna supports providing).

Figure 3:
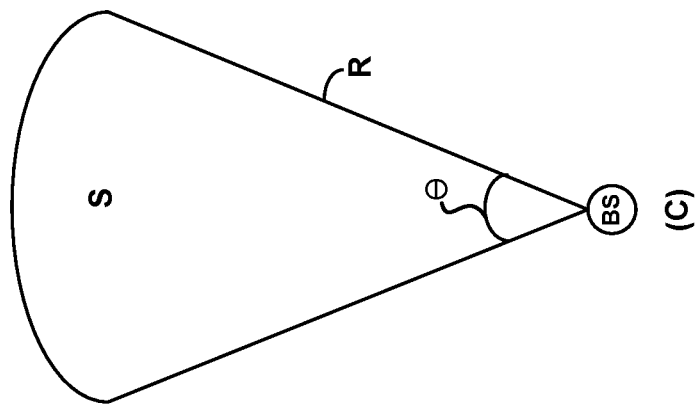
FIG. 3 is a simplified depiction of example cells showing differences in example geometric size.
Figure 3:
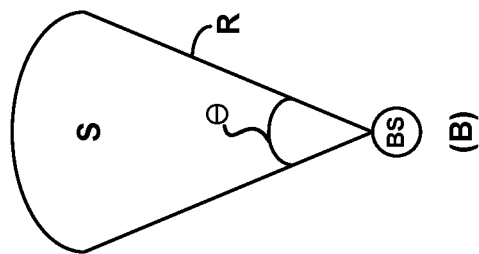
Figure 3:
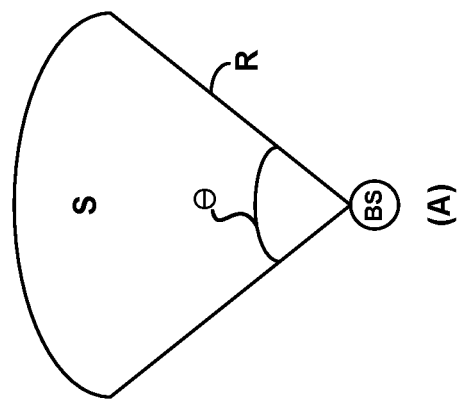

FIG. 3 is a simplified depiction to illustrate example geometric sizes of cells. Namely, FIG. 3 shows three example cell arrangements A, B, C, representing base station cell coverage in a horizontal azimuth plane (disregarding elevation for simplicity). In each arrangement, the cell has representative geometric sizes including, without limitation, a radius R, a beamwidth θ, and a surface area S.

The radius R of a base station's cell could represent the effective maximum distance that a typical UE could be from the base station and still engage in adequate uplink and downlink communication with the base station. The beamwidth θ of the cell could then represent how wide the cell's antenna-radiation pattern is, typically measured as the angle between half-power points of the main lobe of the radiation pattern. And the surface area S of the cell could represent the size of the geographic area covered by the cell.

The radius, beamwidth, and surface area of a cell could be configured statically based on engineering design and/or could vary dynamically based on a variety of factors.

Further, these geometric sizes could be determined by engineering analysis and/or by the base station or other network entities, based on drive-test analysis, UE measurement reporting, and/or other information, or could be set by manufacturers specifications or the like. For example, the cell's radius could be determined by computing signal delays (e.g., SRS signal delays) between served UEs and the base station, determining associated distances based on the computed signal delays, and determining a maximum of the determined distances. The cell's beamwidth could be determined by determining locations or angles of arrival associated with UEs reporting downlink receive power at half of the base station's transmission power and computing a representative angle between those half-power points. And the cell's surface area could be determined by tracking and plotting locations of UEs that detect and report coverage of the base station, and determining a size of the geographic area bounding the identified locations. Other examples are possible as well.

These example geometric sizes could vary from cell to cell and/or from time to time for a given cell. Referring to FIG. 3, cell arrangements A and B are shown having the same radius as each other, but arrangement A is shown having a wider beamwidth than arrangement B and thus having a larger surface area than arrangement B. Further, arrangements B and C are shown having the same beamwidth as each other, but arrangement C is shown having a longer radius than arrangement B and thus having a larger surface area than arrangement B. Other variations in geometric size from cell to cell, or from time to time for a given cell, may be possible as well.

In a representative implementation, the maximum quantity of UEs per MU-MIMO group in a cell could be set based on at least one of these example geometric sizes of the cell and/or based on one or more other geometric sizes of the cell.

To facilitate this, a base station or other entity could have access to mapping data (reference data) that maps (correlates) various geometric size values to maximum quantities of UEs per MU-MIMO group. In practice, this mapping data could be established by engineering design and could be provided to the base station or other entity for reference.

Without limitation, the mapping data could comprise a table that lists various ranges or values of cell radius, beamwidth, surface area, or combinations of these or other geometric sizes, and correlates the ranges or values with a respective maximum quantities of UE per MU-MIMO group. In line with the discussion above, the mapping data could be structured to make the maximum quantity of UEs per MU-MIMO group proportional to the geometric size value(s). That is, for larger geometric sizes the mapping data could specify larger maximum quantities of UEs per MU-MIMO group, and for smaller geometric sizes, the mapping data could specify smaller quantities of UEs per MU-MIMO group.

Thus, given a determination or indication of the geometric size of a cell, the base station or other entity could determine based at least on the mapping data what the maximum quantity of UEs should be per MU-MIMO group in the cell. And the base station could then be configured to apply the determined maximum quantity of UEs per MU-MIMO group, i.e., to limit the number of UEs per MU-MIMO group to the determined maximum quantity.

In an example implementation of this process, the base station could determine a geometric size of its cell, either by an evaluation as described above or by referring to stored data that specifies the geometric size. And the base station could then refer to mapping data or similar logic to determine based on the geometric size what the maximum quantity of UEs should be per MU-MIMO group. The base station could then set itself to limit the maximum quantity of UEs per MU-MIMO groups accordingly. For instance, the base station could store an indication of the determined maximum quantity of UEs per MU-MIMO group.

Further, in another example implementation, another entity, such as another network entity and/or an engineer of a wireless service provider, could determine the geometric size of the base station's cell, by reference to stored data or other such information and could refer to mapping data or similar logic to determine based on the geometric size what the maximum quantity of UEs should be per MU-MIMO group. And the entity could then enter into and/or signal to the base station to configure the base station with an indication of the determined maximum quantity of UEs per MU-MIMO group.

When the base station is then going to establish a MU-MIMO group, the base station could refer to its stored or configured indication and accordingly limit itself to identifying up to the indicated quantity of orthogonal UEs for the MU-MIMO group. For instance, if the maximum quantity is two UEs, then once the base station has identified two UEs that are orthogonal to each other and will be grouped together in a MU-MIMO group, the base station could forgo searching for any further UEs that are orthogonal to those two UEs, and the base station could then serve the group of two UEs on the same PRBs as each other. Whereas, if the maximum quantity is five UEs, then once the base station has identified two UEs that are orthogonal to each other, the base station could continue its processing in an effort to find up to three more UEs that are each orthogonal to each other and to the already-identified UEs. And upon identifying the group of up to five orthogonal UEs, the base station could serve the group of UEs on the same PRBs as each other.

Further, this process of setting the maximum quantity of UEs per MU-MIMO group could be repeated from time to time, such as periodically or in response to various triggers, to confirm or adjust the maximum quantity of UEs per MU-MIMO group, possibly based on changes in the geometric size of the cell.

Figure 4:
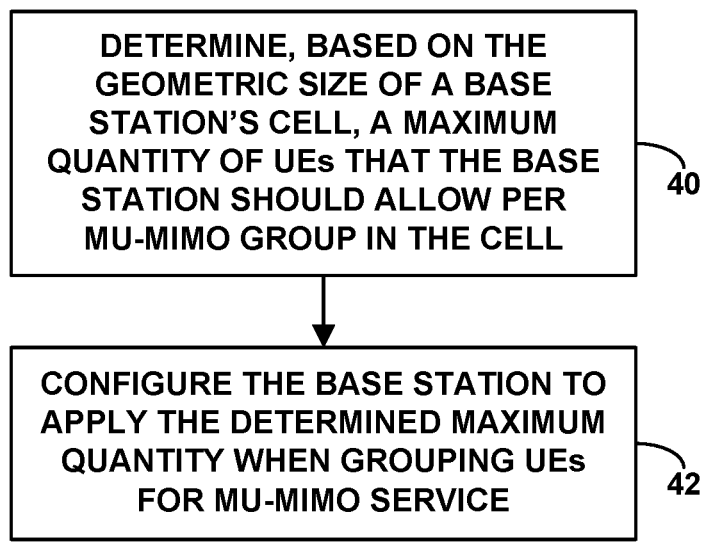
FIG. 4 is a flow chart depicting operations that can be carried out in accordance with the disclosure.

FIG. 4 is a flow chart depicting an example method that could be carried out in accordance with this disclosure, to configure a base station to group UEs for MU-MIMO service, where the base station provides wireless communication service in a cell that has a geometric size. As shown in FIG. 4, at block 40, the method includes determining based on the geometric size of the cell, a maximum quantity of UEs that the base station should allow per MU-MIMO group. And at block 42, the method includes configuring the base station to apply the determined maximum quantity when grouping UEs for MU-MIMO service.

In line with the discussion above, the geometric size of the cell could comprise a radius of the cell, a beamwidth of the cell, and/or a surface area of the cell, among other possibilities. Further, the method could be carried out by the base station.

As discussed above, the act of determining the maximum quantity based on the geometric size could involve referring to mapping data that maps geometric-size values to maximum quantities of UEs that should be allowed per MU-MIMO group, such as mapping data that makes the maximum quantities of UEs proportional to the geometric-size values.

Further, the act of configuring the base station to apply the determined maximum quantity when grouping UEs for MU-MIMO service could involve storing in the base station an indication of the determined maximum quantity, such that, when the base station groups UEs for MU-MIMO service, the base station limits the quantity of UEs per MU-MIMO group according to the stored indication. And the act of limiting the quantity of UEs per MU-MIMO group according to the stored indication could involve, once the base station has established a MU-MIMO group consisting of the maximum quantity of UEs, forgoing by the base station from seeking to identify an additional UE to add to the MU-MIMO group.

Figure 5:
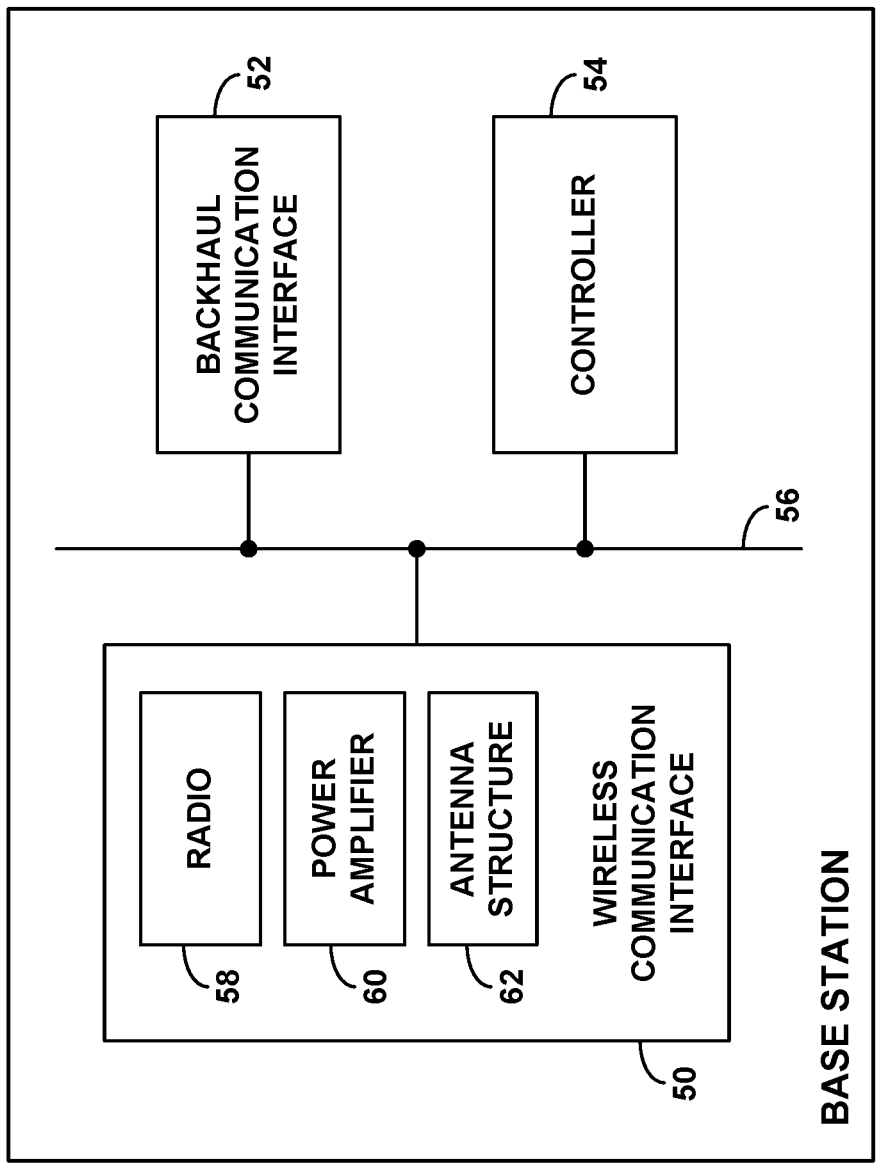
FIG. 5 is a simplified block diagram of a base station operable in accordance with the disclosure.

FIG. 5 is next a simplified block diagram of an example base station that could operate in accordance with the present disclosure to control grouping of UEs for MU-MIMO service in a scenario where the base station provides wireless communication service in a cell that has a geometric size.

As shown in FIG. 5, the example base station includes a wireless communication interface 50, a backhaul communication interface 52, and a controller 54, which could be integrated together and/or communicatively linked by a network, system bus, or other connection mechanism 56.

Wireless communication interface 50 includes a radio 58, a power amplifier 60, and antenna structure 62. The radio could operate to interface between encoded baseband signals and RF signals. The power amplifier could operate to amplify signals. And the antenna structure 62 could comprise a plurality of antennas for communicating on an air interface of the cell, where the air interface defines time-frequency resources for carrying data wirelessly between the base station and UEs served by the base station. As discussed above, the antenna structure could comprise an antenna array, such as a massive-MIMO array for instance.

Backhaul communication interface 52 could be a network communication interface (e.g., an Ethernet network interface port and/or connection) through which the base station can communicate with various other network entities.

And controller 54, which could comprise a processing unit, data storage, and program instructions stored in the data storage and executable by the processing unit, or could take other forms, could be operable to cause the base station to carry out various operations as described herein. For instance, the operations could include (i) determining, based on the geometric size of the cell, a maximum quantity of UEs that the base station should allow per MU-MIMO group and (ii) applying the determined maximum quantity when grouping UEs for MU-MIMO service. And in a more specific implementation, the controller could be configured to schedule use of the time-frequency resources to carry data wirelessly between the base station and the UEs, the controller could be configured to select a group of the UEs to be a MU-MIMO group that the controller will schedule to communicate with the base station on the same time-frequency resources as each other, and the controller could be configured to limit a size of the MU-MIMO group to a maximum quantity of UEs, the maximum quantity being based on the geometric size of the cell.

Further, various features described above can be applied in this context as well, and vice versa.

Exemplary embodiments have been described above. Those skilled in the art will understand, however, that changes and modifications may be made to these embodiments without departing from the true scope and spirit of the invention.

We claim:

1. A method for configuring a base station to group user equipment devices (UEs) for Multi-User Multiple-Input-Multiple-Output (MU-MIMO) service, wherein the base station provides wireless communication service in a cell having a geometric size, the method comprising:

determining, based on the geometric size of the cell, a maximum quantity of UEs that the base station should allow per MU-MIMO group, wherein determining the maximum quantity based on the geometric size comprises referring to mapping data that maps various ranges of geometric-size values respectively to maximum quantities of UEs that should be allowed per MU-MIMO group; and configuring the base station to apply the determined maximum quantity when grouping UEs for MU-MIMO service.

2. The method of claim 1, wherein the geometric size of the cell comprises a size selected from the group consisting of a radius of the cell and a beamwidth of the cell.

3. The method of claim 1, wherein the geometric size of the cell comprises a surface area of the cell.

4. The method of claim 1, carried out by the base station.

5. The base station of claim 1, wherein the mapping data makes the maximum quantities of UEs proportional to the geometric-size values.

6. The method of claim 1, wherein configuring the base station to apply the determined maximum quantity when grouping UEs for MU-MIMO service comprises storing in the base station an indication of the determined maximum quantity, wherein when the base station groups UEs for MU-MIMO service, the base station limits the quantity of UEs per MU-MIMO group according to the stored indication.

7. The method of claim 6, wherein limiting the quantity of UEs per MU-MIMO group according to the stored indication comprises, once the base station has established a MU-MIMO group consisting of the maximum quantity of UEs, forgoing by the base station from seeking to identify an additional UE to add to the MU-MIMO group.

8. A base station operable to control grouping of user equipment devices (UEs) for Multi-User Multiple-Input-Multiple-Output (MU-MIMO) service, wherein the base station provides wireless communication service in a cell having a geometric size, the base station comprising:

an antenna array comprising a plurality of antennas for communicating over an air interface of the cell, wherein the air interface defines time-frequency resources for carrying data wirelessly between the base station and UEs served by the base station; and a controller having a processing unit and non-transitory data storage holding program instructions executable by the processing unit to cause the base station to carryout operations including (i) determining, based on the geometric size of the cell, a maximum quantity of UEs that the base station should allow per MU-MIMO group and (ii) applying the determined maximum quantity when grouping UEs for MU-MIMO service, wherein determining the maximum quantity based on the geometric size comprises referring to mapping data that maps various ranges of geometric-size values respectively to maximum quantities of UEs that should be allowed per MU-MIMO group.

9. The base station of claim 8, wherein the geometric size of the cell comprises a size selected from the group consisting of a radius of the cell and a beamwidth of the cell.

10. The base station of claim 8, wherein the geometric size of the cell comprises a surface area of the cell.

11. The base station of claim 8, wherein the mapping data makes the maximum quantities of UEs proportional to the geometric-size values.

12. The base station of claim 8, wherein applying the determined maximum quantity when grouping UEs for MU-MIMO service comprises storing an indication of the determined maximum quantity and limiting the quantity of UEs per MU-MIMO group according to the stored indication.

13. The base station of claim 8, wherein applying the determined maximum quantity when grouping UEs for MU-MIMO service comprises, once the controller has established a MU-MIMO group consisting of the maximum quantity of UEs, forgoing by the controller from seeking to identify an additional UE to add to the MU-MIMO group.

14. A base station operable to control grouping of user equipment devices (UEs) for Multi-User Multiple-Input-Multiple-Output (MU-MIMO) service, wherein the base station provides wireless communication service in a cell having a geometric size, the base station comprising:

an antenna array comprising a plurality of antennas for communicating over an air interface of the cell, wherein the air interface defines time-frequency resources for carrying data wirelessly between the base station and UEs served by the base station; and a controller configured to schedule use of the time-frequency resources to carry the data wirelessly between the base station and the UEs, wherein the controller is configured to select a group of the UEs to be a MU-MIMO group that the controller will schedule to communicate with the base station on the same time-frequency resources as each other, wherein the controller is configured to limit a size of the MU-MIMO group to a maximum quantity of UEs, the maximum quantity being based on the geometric size of the cell, and wherein the controller is configured to determine the maximum quantity based on the geometric size by referring to mapping data that maps various ranges of geometric-size values respectively to maximum quantities of UEs that should be allowed per MU-MIMO group.

15. The base station of claim 14, wherein geometric size comprises a size selected from the group consisting of (i) a radius of the cell, (ii) a beamwidth of the cell, and (iii) a surface area of the cell.

16. The base station of claim 14, wherein the mapping data makes the maximum quantities proportional to the geometric-size values.

17. The base station of claim 16, wherein the controller is configured to store an indication of the determined maximum quantity and to limit the size of the MU-MIMO group according to the stored indication.

18. The base station of claim 14, wherein limiting the quantity of UEs per MU-MIMO group comprises, once the controller has established a MU-MIMO group consisting of the maximum quantity of UEs, forgoing by the controller from seeking to identify an additional UE to add to the MU-MIMO group.

* * * * *